E. WOODS.
Corn Planter.
No. 3,879.
Patented Jan. 10, 1845.
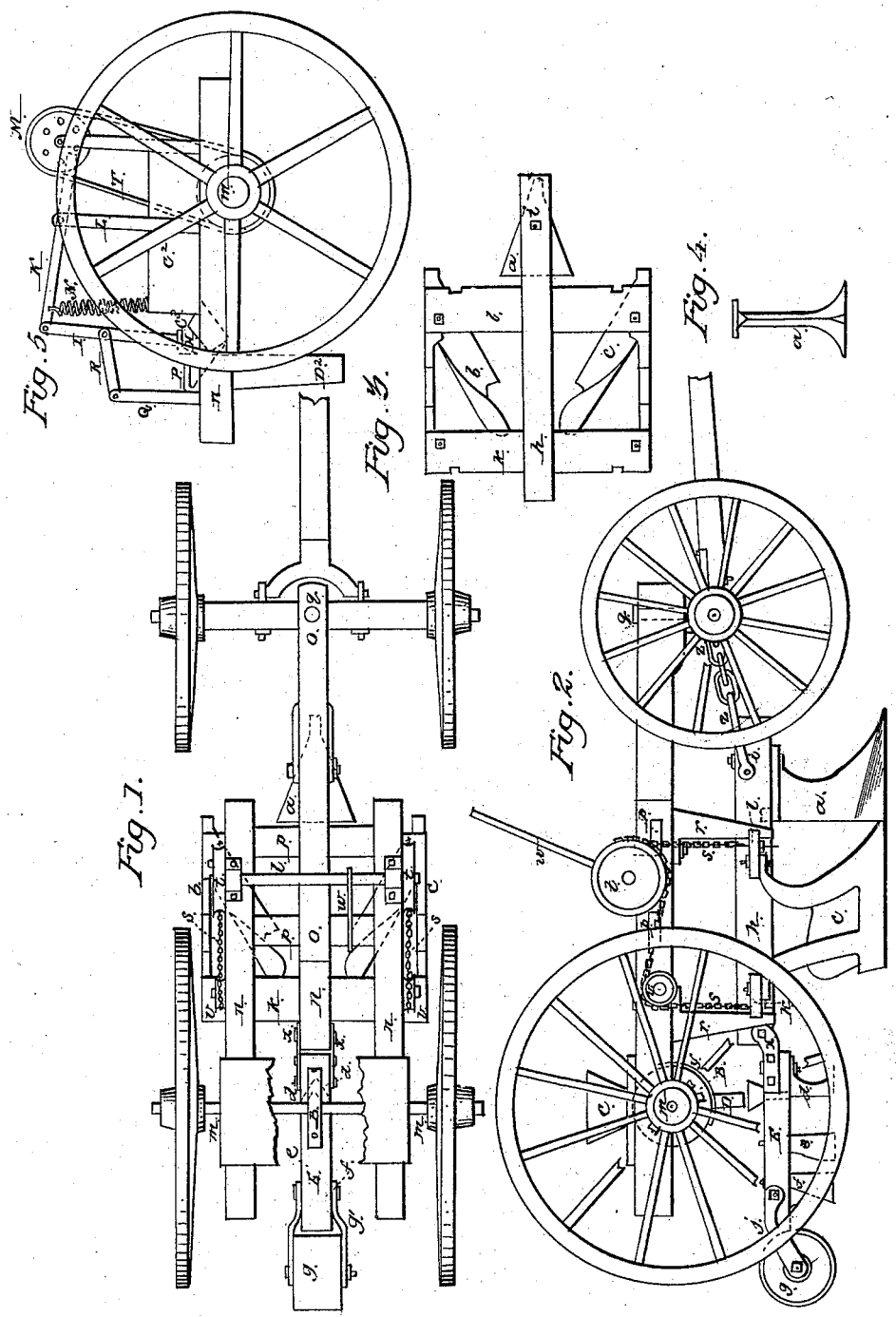

UNITED STATES PATENT OFFICE.

E. WOODS, OF BELOIT, WISCONSIN TERRITORY.

IMPROVEMENT IN PLANTING-MACHINES.

Specification forming part of Letters Patent No. 3,879, dated January 10, 1845.

*To all whom it may concern:*

Be it known that I, ENOCH WOODS, of Beloit, in the county of Rock and Territory of Wisconsin, have invented a new and useful Machine for Plowing or Ridging, Planting, and Dressing or Cultivating Corn, and for other purposes; and I do hereby declare that the following is a full and exact description, reference being had to the drawings.

This machine consists of the combination of a plowing or ridging apparatus with a corn-planting apparatus, of which Figure 1 represents a top, and Fig. 2 a side view, and the details of its construction and use may be more particularly described as follows:

The plowing or ridging apparatus is constructed with three plows, $a$, $b$, and $c$, placed in a triangular position, as seen in Figs. 1 and 3, attached to a frame, as shown also in the drawings. These plows may be of cast-iron or any other suitable material. The front plow, $a$, being intended to loosen and stir up the earth, (but not to turn a furrow,) is without the part called the "mold-board," and its form will be understood on reference to Figs. 2, 3, and 4, in which the former exhibits a side view and the latter a front view, while Fig. 3 shows the form of the base.

The plows $b$ and $c$ are essentially the same as the common plow, (the one having the mold-board on the right and the other on the left,) but are without the common beam and handles, being, together with the plow $a$, attached to a frame which may be constructed of three pieces of wood, as seen in Fig. 3, where $h\ i$ represents a beam four or five inches wide by five or six inches deep, and about four feet long. $k$ and $l$ are two slats or sword-pieces, passing horizontally through the beam $h\ i$, being about two by six inches in width and thickness and about two and a half feet long. The three plows are secured by bolts or otherwise to the under side of this frame, as seen in Figs. 2 and 3. This frame, with its plows attached, may be mounted on common two-horse wagon-wheels in the following manner: The fore wheels should have an axle-tree similar to that of a common wagon, of such length that the wheels may run about three feet apart. Connected with this axle-tree should be a shaft or pole, also similar to that of a common two-horse wagon. The hind wheels are attached to a shaft or axle, $m\ m$, of iron or wood, with journals inside of the wheels, to run in boxes attached to or formed in the side timbers of the wagon-frame, one or both of the wheels being made fast to the axle, so that the axle may revolve with the wheels.

The wagon-frame may be constructed of three longitudinal pieces $n\ n\ o$, Fig. 1, connected by two sword-pieces, $p\ p$, about one and a half or two by four or five inches, the side pieces, $n\ n$, being about two feet from outside to outside, and extending one or two feet back of the hind axle and forward about three and a half feet. The center piece, $o$, having its forward end attached by the king-bolt $q$ to the forward axle, should extend backward between the side pieces, $n\ n$, so as to lap about two feet, the fore axle being carried so far forward that the fore wheels may clear the forward ends of the side pieces, $n\ n$, on turning the axle upon the king-bolt. The wagon being thus prepared, the plow-frame is placed under the wagon-frame, as seen in Figs. 1 and 2, there being four guide-pieces, $r\ r$, &c., near the ends of the sword-pieces $k$ and $l$, attached either to the wagon-frame or to the plow-frame, and so arranged as to confine or limit the plow-frame to a nearly vertical motion, which may be communicated to it by the four chains $s\ s\ s\ s$, two of which wind directly upon the two small grooved wheels $t\ t$, and the other two wind on the same wheels after passing over the pulley-wheels $v\ v$. The wheels $t\ t$ being mounted on a windlass turned by the lever $w$, as will readily be seen, the plows, with their frame, may be raised and lowered in the direction of the guides $r\ r$, &c., at pleasure. Thus may be regulated the depth of plowing, or the plows raised quite out of the ground, when desired, for turning, &c.

The beam of the plow-frame is connected by a clevis and chain, $z\ z$, to the fore axle or the king-bolt $q$, the connection being so adjusted as to sustain the principal draft or resistance of the plows.

For the chains and wheels here described for raising the plows may be substituted racks and pinions or any other mechanical contrivance that may be found best suited to the purpose.

The corn-planting apparatus has a box or hopper, C, to contain the corn to be planted, with a small hole in the bottom sufficient to let the corn run out when not prevented, the wheel B mounted on the center of the hind axle, with its circumference running so near to the bottom of the hopper as to prevent the corn from escaping, the rim of the wheel having a number of small cavities equidistant from one another just large enough to contain as many kernels as it is desired to plant in a hill. These cavities as they pass under the hole in the hopper are filled with corn, which is retained therein by the concave $y$ (fitting close to the rim of the wheel) until the cavity arrives at the top of the conducting-tube D, when it is suffered to drop through said tube, and, passing through the block E, falls directly behind the small plow or furrowing-instrument $d$ in the channel made by said instrument, and is covered by the paddles $e$ and $f$ and the earth leveled and pressed over it by the roller $g$. The instrument $d$ is similar in shape to the front plow, $a$, but much smaller and proportionally broader above the base, has a channel down the hind side down which the corn may pass. $e$ and $f$ are plates or teeth of metal or other material inclined to the right and left, as seen in Fig. 1, so as to haul the earth over the corn, being placed one in advance of the other to prevent clogging by stubble, &c. $d$, $e$, and $f$ are attached to the block E, which is connected with the rear end of the plow-frame by the bolt or pin $x$, the manner of which, as also of the connection of the roller $g$, will be made obvious by an inspection of the drawings at $x$ and $g'$.

The mode of using this machine for ridging and planting corn will readily be understood. The machine being mounted and arranged, as seen in Figs. 1 and 2, the plows let down to the proper pitch, and the carriage drawn centrally over the line where it is designed to plant a row of corn, the front plow, $a$, will loosen and stir the earth well in the center. The two plows $b$ and $c$ will throw up two good furrows in a ridge for the corn to be planted in. The planting apparatus, coming after, will plant the corn and complete the work. The two plows $b$ and $c$ being about two and a half feet from outside to outside and the rows four feet apart, (the usual distance in the Western States,) the ground is all thoroughly plowed, except one and a half foot in width between each two rows. This space may remain without detriment to the corn until the time of the first hoeing or dressing. It is then designed to remove the planting apparatus and use the remainder of the same machine for dressing the corn, for which purpose the two plows $b$ and $c$ are to be changed on opposite sides of the beam $h\ i$, with their landsides from six to ten inches apart, so as to turn their furrows outward. The machine is then to be passed centrally between rows, stirring that portion of ground left at the time of planting, and throwing it near the corn-hills.

This machine is also intended to be used for planting potatoes, the corn-planter being removed, the plows arranged as in Figs. 1 and 3, and fixtures adapted for dropping the potatoes immediately behind the front plow, $a$, where they will be covered by the plows $b$ and $c$.

The advantages of this improvement over the methods heretofore in general use for performing the same work are—

First, that with this machine a single man and sufficient team can perform the whole work of plowing or ridging and planting at a single operation, thereby effecting a very great saving of time and expense.

Second, by adapting the apparatus to common wagon-wheels, which are found on almost every farm, and by the several changes above described in the several parts of the apparatus, a single machine may be acquired at a moderate expense which will perform a great variety of work with great expedition.

Third, by having the ground plowed at the same time with planting the weeds are turned under and more effectually kept down till the corn has time to get a good start, whereas when the ground has been plowed for several days or weeks before planting, as is usually the case in the common method, the weeds get so much the start of the corn as to be very detrimental to its growth.

Combined with this machine is an apparatus for planting potatoes. It consists of a picker, which picks the potatoes from the hopper and carries them against a scraper or plate that scrapes them from the picker into a spout, that conducts them to the rear of the hollow tooth $d$, when they are dropped into the furrow and covered by the coverers $e\ f$. The picker H is a row of teeth or comb projecting downward nearly at right angles from a plate of metal fastened to the lower end of a suspended bar, I, which is connected to the end of a vibrating lever, K, whose fulcrum is a post, L, inserted into the frame of the machine, said lever being acted on by pins or cogs M, extending at right angles in a circle from the face of a revolving wheel, said pins striking the opposite end of the lever K and bearing it down, and at the same time lifting the opposite end, to which the pickers are fastened, and extending the coils of a spiral spring, N, fastened to the under side of said lever and to the frame or hopper, which spring, as the pins leave the lever, in again contracting itself, drives down the lever and the pickers, causing the latter to penetrate the potatoes, and the next succeeding pin of the circle, striking the lever again, lifts the pickers with the potatoes thereon, being brought in contact with the scraping-plate P, from which they are scraped into the conducting-tube $D^2$, as before described, by means of the connecting-bars Q R, attached to the frame of the carriage and to the suspended bar for changing the direction of the pickers as they are lifted with the potatoes thereon. The hopper $C^2$, containing the potatoes, is placed directly over the hind axle-tree, $m$, of the carriage, having its rear end at $C^3$ inclined toward the trough $D^2$, for the purpose of bringing the potatoes more directly to the action of the pickers. The wheel containing the pins in its side for depressing the end of the lever is turned by a band, T, passed around it and around a pulley on the axle $m$ of the carriage.

The invention claimed, and desired to be secured by Letters Patent, is—

The combination of the apparatus for dropping or planting potatoes with the apparatus for plowing the ground, opening the drills, and covering the seed, as described.

ENOCH WOODS.

Witnesses:
EDM. MAHER,
JOHN SMITH HANNA.